United States Patent
Parkinson et al.

(10) Patent No.: US 7,823,947 B1
(45) Date of Patent: Nov. 2, 2010

(54) INTERCHANGEABLE SPEAKER POCKET

(75) Inventors: Matthew Frank Parkinson, Ann Arbor, MI (US); Robert Charles Steinbrecher, Dexter, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/546,141

(22) Filed: Aug. 24, 2009

(51) Int. Cl.
B60R 7/04 (2006.01)
(52) U.S. Cl. .................... 296/37.13; 296/146.7
(58) Field of Classification Search ............... 296/37.1, 296/37.8, 37.13, 146.7
See application file for complete search history.

(56) References Cited

U.S. PATENT DOCUMENTS

| | | | |
|---|---|---|---|
| 2,934,374 A | 4/1960 | Mortenson et al. | |
| 6,199,948 B1 | 3/2001 | Bush et al. | |
| 6,971,698 B1* | 12/2005 | King | 296/37.13 |
| 7,517,002 B2* | 4/2009 | Reed et al. | 296/146.7 |
| 2009/0051186 A1* | 2/2009 | Augustyn | 296/37.13 |

OTHER PUBLICATIONS

Co-pending U.S. Appl. No. 12/546,141, filed Aug. 24, 2009.
Co-pending U.S. Appl. No. 12/628,375, filed Dec. 1, 2009.
Co-pending U.S. Appl. No. 12/546,241, filed Aug. 24, 2009.

* cited by examiner

Primary Examiner—Joseph D Pape
(74) Attorney, Agent, or Firm—Gifford, Krass, Spinkle, Anderson & Citkowski, P.C.

(57) ABSTRACT

A storage compartment for mounting on a trim panel of an automobile door. The trim panel includes an aperture configured to receive a speaker assembly. The storage compartment includes a rear wall, a side wall bounding the rear wall to define a storage cavity and having a perimeter which is complementary in shape to the aperture. A retaining wall having a shape which is substantially similar to a portion of the aperture is attached to a portion of the side wall which is adjacent to the bottom end of the rear wall by a living hinge. The living hinge allows the retaining wall to hinge relative to the rear wall so as to cover a portion of the storage cavity.

15 Claims, 4 Drawing Sheets

INTERCHANGEABLE SPEAKER POCKET

FIELD OF THE INVENTION

The present invention relates to a trim panel for a door of an automotive vehicle having a speaker opening and, more particularly, to a storage compartment having a retaining wall attached by a living hinge for mounting to the speaker opening of the trim panel.

BACKGROUND OF THE INVENTION

In an effort to expand the consumer base of a single vehicle model, manufacturers offer a variety of different option packages which allow a single vehicle model to fulfill a wide range of consumer requirements. To satisfy the needs of consumers requiring work-related vehicles, manufacturers offer various option packages which strip down the vehicle of many of the usually standard amenities.

One such amenity which is often removed for a fleet or work vehicle is the audio system. Removing the audio system, including the radio, the CD player and the audio speakers, allows a consumer to reduce costs, avoid interference with any consumer equipped communication system, and to focus the vehicle driver due to the removal of distractions.

In addition, manufactures offer various audio option levels for a single vehicle model. The audio option packages range from a standard option to an upgraded option. The upgraded audio options often include surround sound which requires additional speakers not present in the standard audio option.

In order to offer the various option packages without affecting the production efficiency it is desirable that the various option packages include as many common pieces as possible. Production efficiency is decreased every time a subsequent operation is required to fulfill the various option packages selected by the consumer.

A problem arises when a customer selects a vehicle without an audio system or the customer selects the standard option and the upgraded audio option includes additional speakers. Efficiency is compromised due to the requirement of a secondary operation to form an opening in the trim panel where the speakers are to be mounted. Initially the trim panel is formed without a speaker opening and depending upon whether the specific vehicle includes the audio system option or the upgraded audio option, a secondary operation is performed on the trim panel to form the speaker opening.

If the vehicle was ordered without the audio system or the standard audio option the secondary operation is not performed. However, this results in a lack of functionality for the area of the trim panel where the speaker opening would be made.

Thus, there exists a need for an improved trim panel assembly which is common to vehicles with the various audio options or without the audio system and which provides functionality for the speaker opening area when the vehicle is ordered with the standard audio package or without the audio system option.

SUMMARY OF THE INVENTION

The present invention provides an improved trim panel which overcomes the above-mentioned disadvantages of the previously known trim panels which must undergo secondary operations depending upon whether the audio system option was selected.

In brief, a storage compartment for mounting on a trim panel of an automobile door is provided. The trim panel includes a storage compartment mounted to the speaker opening if the audio system option is not selected or the standard audio option is selected. The storage compartment includes a rear wall and a side wall bounding the rear wall to define a storage cavity. The side wall has a perimeter which is complementary in shape to the speaker opening. A retaining wall having a shape substantially similar to a portion of the speaker opening is attached to a portion of the side wall adjacent the lower end of the rear wall by a living hinge. The living hinge allows the retaining wall to hinge relative to the rear wall such that the retaining wall covers a portion of the storage cavity.

By providing a storage compartment mounted to the speaker opening, production efficiency is increased as a single trim panel, without any subsequent operations, can be used regardless of the audio option selected or whether the vehicle includes an audio system. The trim panel is initially formed having a speaker opening which is used to mount the speaker assembly if vehicle includes the audio system or whether the upgrade audio option is selected. The trim panel is fitted with the storage compartment if the vehicle does not include the audio system or the standard audio option is selected.

Further, by providing the retaining wall attached to the storage compartment by a living hinge, the storage compartment is formed as a single part. Forming the storage compartment as a single part saves costs by reducing labor and manufacturing expenses.

As the storage container includes an integrally formed retaining wall covering a portion of the storage cavity, which has a perimeter complementary in shape to the speaker opening, storage items may be retained in the storage compartment without exceeding the design envelope of the speaker assembly. Thus, the storage compartment can be quickly and easily entered into the design of existing trim panels without interfering with other door mechanisms.

BRIEF DESCRIPTION OF THE DRAWINGS

A better understanding of the present invention will be had upon reference to the following detailed description when read in conjunction with the accompanying drawings, wherein like reference characters refer to like parts throughout the several views and in which.

DETAILED DESCRIPTION OF A PREFERRED EMBODIMENT OF THE PRESENT INVENTION

The present invention has utility as a trim panel having a storage compartment for mounting to an aperture configured to receive a speaker assembly. By providing the storage compartment with an outer shape complementary to the aperture formed for the speaker assembly a single door trim panel may be formed which can be used regardless of the audio option selected or whether the vehicle includes an audio system without the need for subsequent toolings. Having a door trim panel which is common to all vehicle option packages eliminates the need for secondary operations and thereby reduces cost and increases manufacturing efficiency. Further, by providing a storage compartment in the door trim panel where no compartment existed prior increases the functionality of the trim panel when the standard audio option is selected or when the vehicle lacks an audio system.

Figure 1:
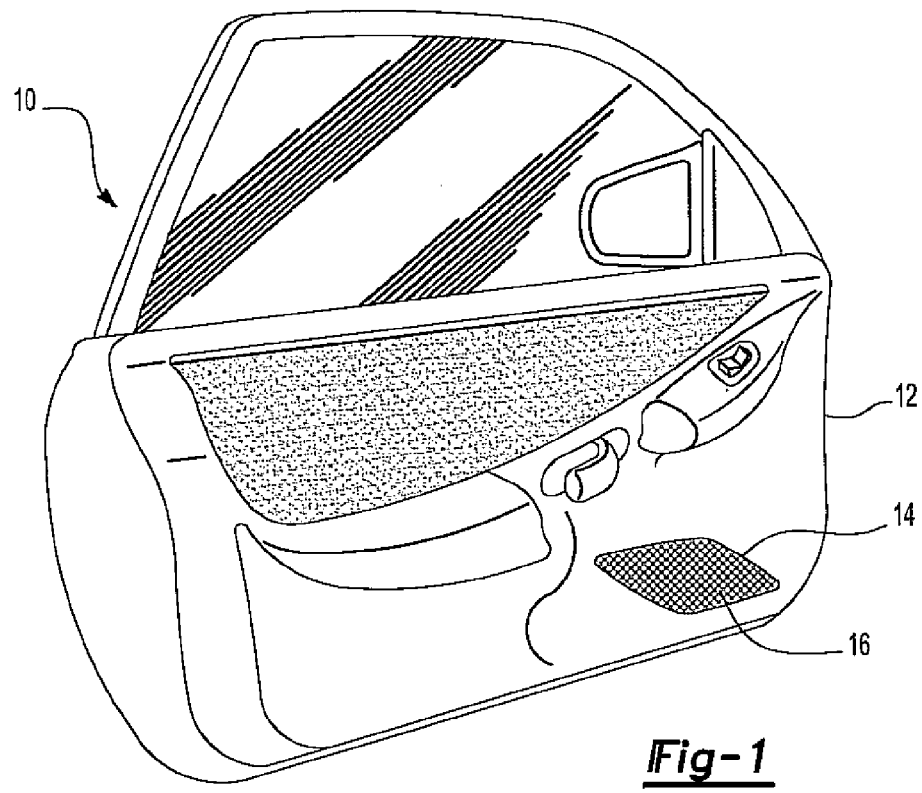
FIG. 1 is a front perspective view illustrating a door of an automobile having a speaker assembly mounted to the speaker opening.
Figure 2:
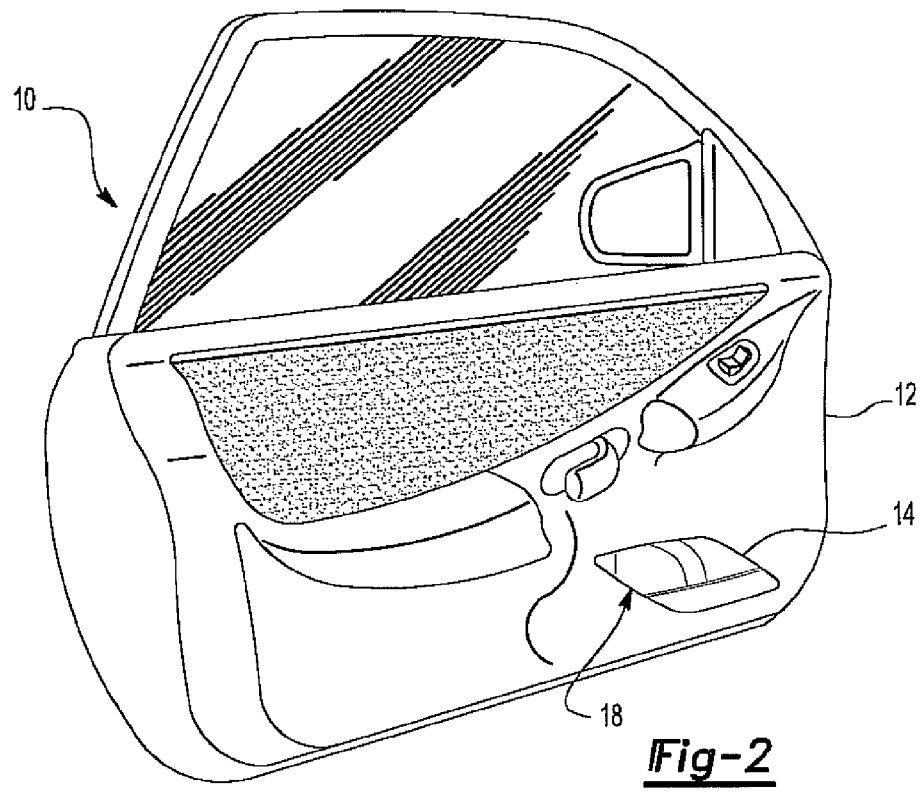
FIG. 2 is a front perspective view illustrating a door of an automobile having the inventive storage compartment mounted to the speaker opening.

With reference to FIG. 1, a door of an automobile is generally illustrated at 10. A trim panel 12 attaches to the door to cover the various door related mechanisms including door handles, window controls, and speaker assemblies and provides an aesthetically pleasing appearance to the interior of the automobile. An aperture 14 is provided in the trim panel 12 to receive a speaker assembly which is covered by the speaker grille 16 if the customer selects to include an audio system or the upgraded audio option package.

However, if the customer does not select to include an audio system or selects the standard audio option package, the aperture 14 is used in conjunction with a storage compartment 18.

Figure 3:
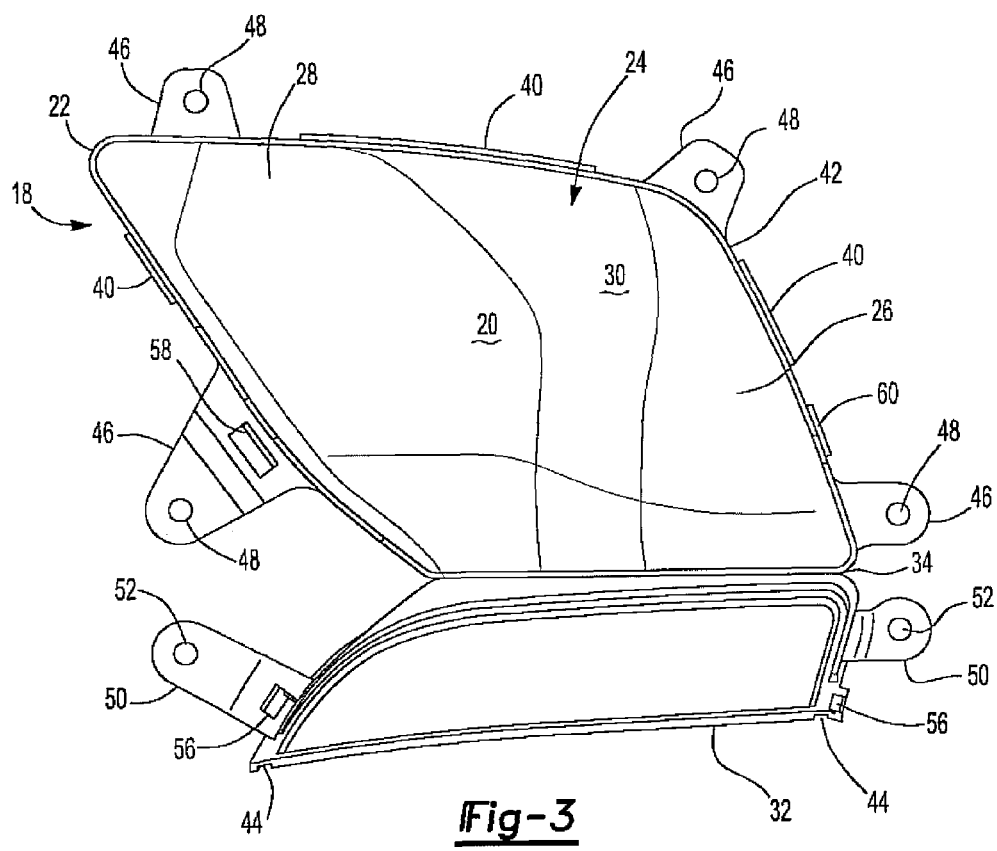
FIG. 3 is a front plane view of the storage compartment having the retaining wall in the open, uninstalled position.

With reference to FIG. 3, the storage compartment 18 includes a rear wall 20 and an side wall 22 which bounds the perimeter of the rear wall 20 and extends outwardly to define a storage cavity 24. As the rear wall 20, when installed, extends from the trim panel 12 towards the door frame, the shape of the rear wall is dictated by the amount of space available.

In one embodiment the rear wall 20 is divided into a first portion 26 and a second portion 28. The first portion 26 is separated from the second portion 28 by a transition portion 30. The first portion 26 has a depth which is less than the depth of the second portion 28, and the transition portion 30 has an angled orientation thereby transitioning the depth of the first portion 26 to the depth of the second portion 28.

Figure 4:
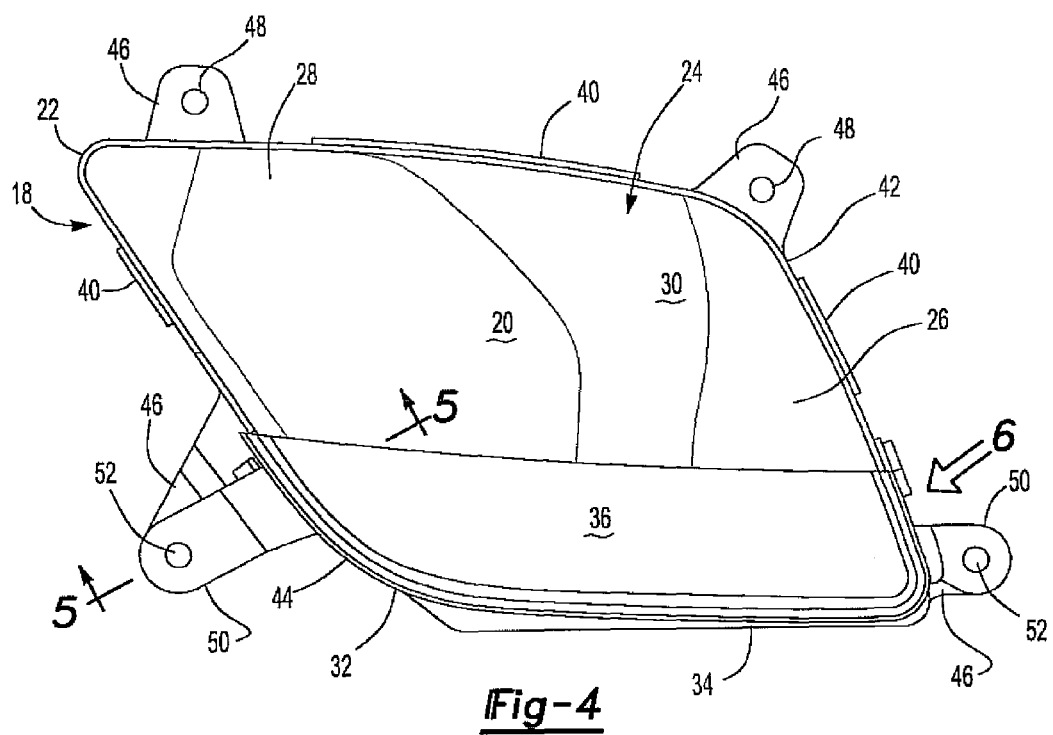
FIG. 4 is a front plane view of the storage compartment having the retaining wall in the closed, installed position.

A retaining wall 32 has a shape which is complementary to a portion of the storage cavity 24 and consequently a portion of the aperture 14. The retaining wall 32 is attached to the storage compartment 18 by a living hinge 34. The living hinge 34 allows the retaining wall 32 to hinge relative to the storage compartment 18 from a preinstalled position as seen in FIG. 3 to an installed position as seen in FIG. 4. When the retaining wall 32 is in the installed position the storage cavity 24 is provided with a partial enclosure allowing storage items placed in the storage compartment 18 to be retained in the storage cavity 24 by the retaining wall 32.

With reference to FIG. 4, the retaining wall 32 is of complementary shape to a lower portion of the storage cavity 24 as formed by the rear wall 20 and the side wall 22. The retaining wall 32 provides several benefits to the storage compartment 18 including the ability to retain storage items within the storage cavity 24, and reducing the number of overall parts as the retaining wall 32 is molded integrally with the storage compartment 18.

The retaining wall 32 includes a front face 36 which, when the retaining wall 32 is placed in the installed position, faces the interior of the passenger compartment. The front face 36 is optionally provided with a stylized appearance through the application of a specific surface treatment, including an aesthetic surface texture or the application of a veneer.

Figure 5:
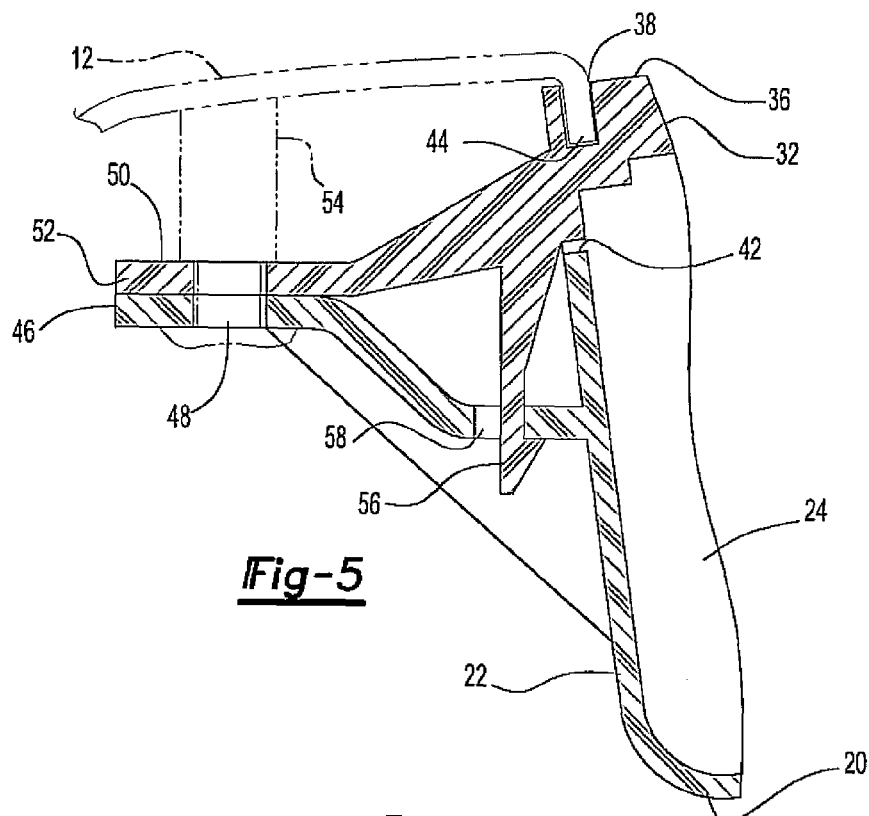
FIG. 5 is a partial cross-sectional view taken along the line 5-5 of FIG. 4.

As best seen in FIG. 5, the aperture 14 formed on the trim panel 12 includes a lip 38 bounding the perimeter and which extends inwardly towards the door frame. In order to position the storage compartment 18 relative to the aperture 14, a number of protrusions 40 extending outwardly from the outside surface of the side wall 22 are provided on the storage compartment 18. The protrusions 40 extend beyond a top edge 42 of the side wall 22 such that when the storage compartment 18 is installed relative to the aperture 14 the protrusions 40 allow the top edge 42 of the side wall 22 to maintain contact with the lip 38.

Figure 6:
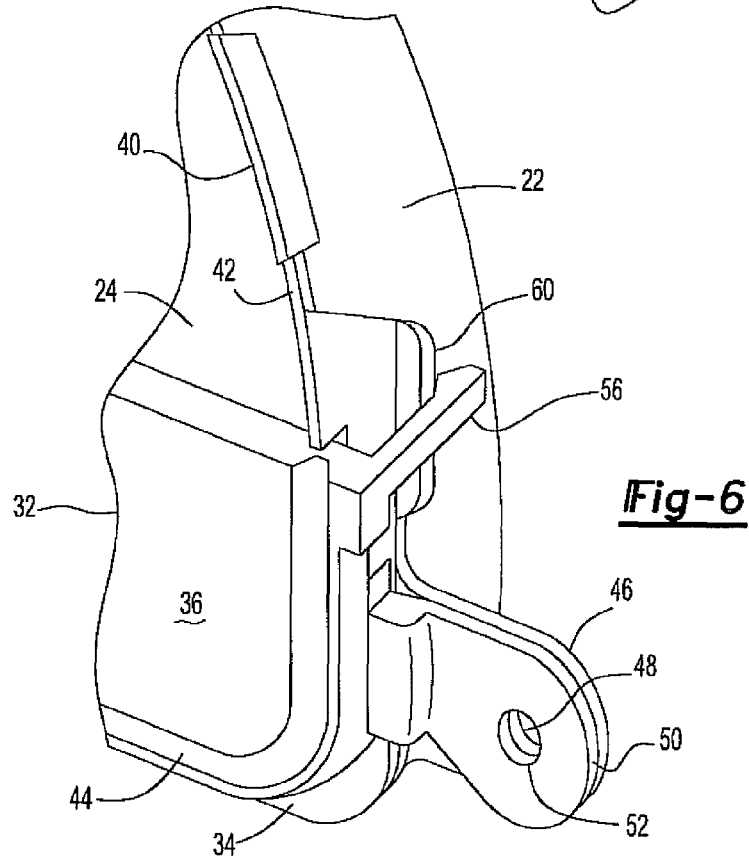
FIG. 6 is a partial perspective view of the storage compartment as viewed from arrow 6 in FIG. 4.

In addition, the retaining wall 32 includes a continuous channel 44 extending along a portion of the perimeter which, when in the installed position, aligns over the side wall 22. The channel 44 is dimensioned such that the bottom is flush with the top edge 42 of the side wall 22. As such, the channel 44 in conjunction with the protrusions 40 engages the lip 38 such that the position of the storage compartment is maintained relative to the aperture 14 as shown in FIGS. 5 and 6.

The storage compartment 18 includes a plurality of tabs 46 extending outwardly from the side wall 22 in a direction which is generally transverse to the direction of the side wall 22. Each of the plurality of tabs 46 includes an aperture 48 in which to secure the storage compartment 18 to the trim panel 12. The retaining wall 32 also includes outwardly extending tabs 50 having apertures 52 formed therein. As seen in FIG. 3, the outwardly extending tabs 50 are disposed on the retaining wall 32 so as to correspond to tabs 46 on the side wall 22. When the retaining wall 32 is in the installed position the outwardly extending tabs 50 align with the matching tabs 46 such that the apertures 48 and 52 overlap.

As such, the storage compartment 18 and the retaining wall 32, when in the installed position, can be secured to the interior of the trim panel 12 by a fastener extending through apertures 40 and 50. It will be appreciated, of course, that any suitable fastener capable of securing one object to another may be used, illustratively including a bolt or screw which engages the trim panel 12, an adhesive, or a heat stake which extends from the interior of the trim panel 12. As seen in FIG. 5, the trim panel 12 is shown in ghost having a projection 54 extending from the interior so as to engage a fastener for securing the storage compartment 18 and the retaining wall 32 to the trim panel 12.

A pair of clips 56 disposed on either side of the retaining wall 32 are used to releasably lock the retaining wall 32 in the installed position. As seen in FIG. 5, the clips 56 are, optionally, formed integral with an outwardly extending tab 50 of the retaining wall 32. In such an embodiment, the tab 46 attached to the side wall 22 includes a slot 58 for receiving the clip 56 to lock the retaining wall 32 in the installed position. As seen in FIG. 6, the other of the pair of the clips 56 attaches to a flange 60 extending from the side wall 22. It is appreciated, of course, that both of the pair of clips 56 are optionally formed in either of the above-described manners.

Figure 7:
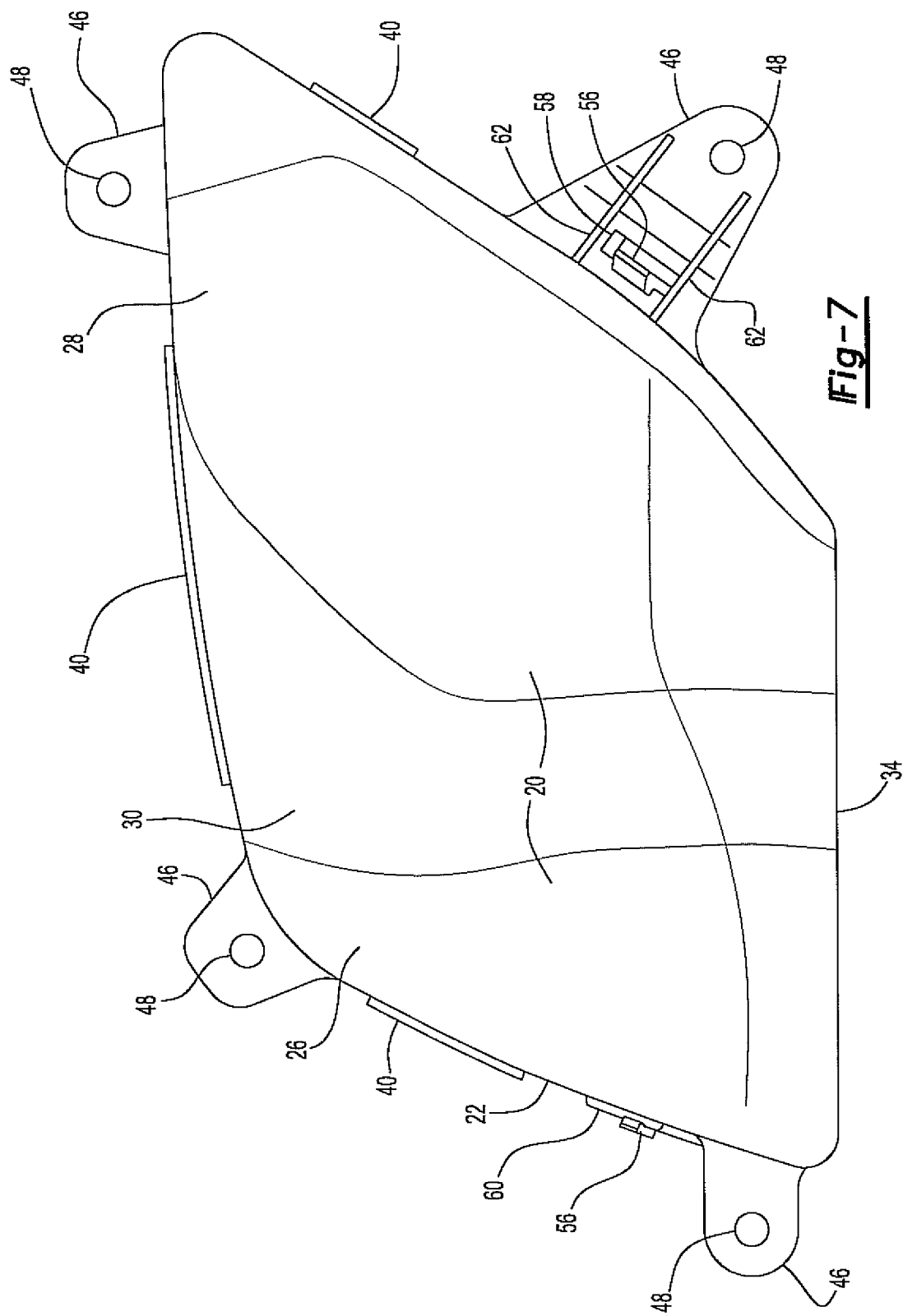
FIG. 7 is a rear plane view of the storage compartment.

With reference to FIG. 7, the tabs 46 extending from the side wall 22 optionally include integrally formed strengthening ribs 62. The ribs 62 strengthen the tabs 46 against deflection during the installation process and during the life of the storage compartment 18.

It will be appreciated, of course, that the present invention is not limited to use with a door trim panel or in conjunction with a motor vehicle door. The inventive storage compartment is capable of increasing production efficiency by providing commonality of parts wherever the presence of a speaker, or any other device or object, is subject to selection.

From the foregoing, it can be seen that the present invention provides a storage compartment for mounting to an aperture dimensioned to receive a speaker assembly so as to add functionality and to increase the commonality of parts regardless of the vehicle the customer selects. Having described the invention, however, many modifications thereto will become apparent to those of ordinary skill in the art to which it pertains without deviation from the spirit of the invention as defined by the scope of the appended claims.

It is claimed:

1. A storage compartment for mounting on a trim panel of an automobile door having an aperture configured to receive a speaker assembly and a lip bounding the perimeter of the aperture, said storage compartment comprising:
    a rear wall;
    a side wall bounding said rear wall to define a storage cavity, said side wall having a perimeter complementary to the shape of the aperture;
    a retaining wall having a shape substantially similar to a portion of the aperture; and
    a living hinge extending between a bottom end of said retaining wall and a portion of said side wall adjacent to a bottom end of said rear wall, said living hinge allowing said retaining wall to hinge relative to said rear wall to cover a portion of said storage cavity.

2. The storage compartment of claim 1, wherein said side wall includes a top edge which contacts the lip when said storage compartment is mounted to the trim panel, and wherein said side wall includes a plurality of protrusions extending beyond said top edge to engage the lip to restrain motion of said storage compartment relative to the trim panel.

3. The storage compartment of claim 2, wherein a channel extends along an outer edge of said retaining wall to engage the lip and to restrain motion of said storage compartment relative to the trim panel.

4. The storage compartment of claim 1, wherein said side wall has at least one outwardly extending tab having an aperture for fastening said side wall to the trim panel.

5. The storage compartment of claim 4, wherein said retaining wall includes at least one outwardly extending tab having an aperture for fastening said retaining wall to the trim panel.

6. The storage compartment of claim 5, wherein upon hinging said retaining wall to cover a portion of said storage cavity said aperture of said at least one tab of said retaining wall aligns with said aperture of said at least one tab of said side wall.

7. The storage compartment of claim 1, wherein said retaining wall has a front face having a stylized surface.

8. A panel assembly for an automobile door comprising:
    a trim panel having an aperture configured to receive a speaker assembly; and
    a storage compartment having:
        a rear wall,
        a side wall bounding said rear wall to define a storage cavity, said side wall having a perimeter complementary in shape to the aperture,
        a retaining wall having a shape substantially similar to a portion of said aperture,
        a living hinge extending between a bottom end of said retaining wall and a portion of said side wall adjacent to a bottom end of said rear wall, said living hinge allowing said retaining wall to hinge relative to said rear wall to cover a portion of said storage cavity.

9. The panel assembly of claim 8, wherein said side wall has at least one outwardly extending tab having an aperture for fastening said side wall to said trim panel.

10. The panel assembly of claim 9, wherein said retaining wall has at least one outwardly extending tab having an aperture for fastening said retaining wall to said trim panel.

11. The panel assembly of claim 10, wherein upon hinging said retaining wall to cover a portion of said storage cavity said aperture of said at least one tab of said retaining wall aligns with said aperture of said at least one tab of said side wall.

12. The panel assembly of claim 8, wherein said retaining wall has a front face having a stylized surface.

13. The panel assembly of claim 1, wherein said trim panel has a lip bounding said aperture, and wherein said side wall includes a top edge which contacts said lip when said storage compartment is mounted to said trim panel.

14. The panel assembly of claim 13, wherein said side wall includes a plurality of protrusions extending beyond said top edge to engage said lip and restrain motion of said storage compartment relative to said trim panel.

15. The panel assembly of claim 13, wherein a channel extends along an outer edge of said retaining wall to engage said lip and to restrain motion of said storage compartment relative to said trim panel.

* * * * *